March 8, 1955     J. A. SENN     2,703,505
APPARATUS FOR ALIGNING MACHINE ELEMENTS
Filed July 3, 1948     5 Sheets-Sheet 5

INVENTOR
Jurg A. Senn
BY W. D. O'Connor
Attorney

United States Patent Office 2,703,505
Patented Mar. 8, 1955

2,703,505

APPARATUS FOR ALIGNING MACHINE ELEMENTS

Jurg A. Senn, Milwaukee, Wis., assignor to Kearney & Trecker Corporation, West Allis, Wis., a corporation of Wisconsin Application July 3, 1948, Serial No. 36,922

7 Claims. (Cl. 88—14)

This invention relates generally to means for determining the relative position of objects and more particularly to an improved arrangement for aligning machine elements and the like.

Another object of the invention is to provide new and improved optical means operating in combination with electronic means for insuring accurate alignment of movable machine elements.

Another object is to provide an improved automatic collimating apparatus utilizing a light projector in combination with prismatic reflecting means and electronic indicating means sensitively responsive thereto.

Another object is to provide an improved aligning device having an extremely high degree of sensitivity.

Another object is to provide an improved aligning means in the form of a light projector on one of two movable objects in combination with light reflecting means associated with light measuring electronic means on the other movable object.

Another object is to provide an electronic aligning apparatus for two movable objects having a visual dial type indicator calibrated in units of linear measure to precisely indicate the degree of misalignment.

Another object is to provide an electronic collimating apparatus adapted to indicate the exact measurements of misalignment between two relatively movable objects.

Another object is to provide an improved aligning means having a light beam projector operating in combination with light beam dividing prisms associated with electronic photometer means and utilizing the inherent multiplication of prism displacement to provide proportionately greater sensitivity in measuring the displacement of the means to be aligned.

A further object is to provide an optical aligning apparatus arranged for continuous functioning through a selectively energizable electronic indicating device.

According to this invention, relatively movable objects are aligned by projecting a light beam from one object toward an electronically sensitive target device on the other object. For the purpose of determining the precise point of alignment between the movable objects as well as a measure of deviation therefrom, the target device is so arranged that a light beam projected thereon will be divided into a plurality of light beam elements of variable intensity proportionate to the degree of misalignment between the movable objects. To this end, the target device includes beam dividing prismatic means in combination with a plurality of light sensitive phototubes, each of the phototubes being adapted to intercept a light beam element reflected by the prismatic means and being actuated thereby in accordance with the relative variance in the light intensity. An electrical metering instrument, preferably calibrated in units of linear measure, is electrically interconnected with the phototubes in manner to provide a visual indication of the relative degree of phototube excitation to indicate the degree of misalignment of the objects.

A modified form of the embodying apparatus utilizes light beam reflectors for causing the beam to travel a plurality of paths between the objects, thereby increasing the sensitivity of the indicating instrument to misalignment of the objects.

Although the particular cooperative aligning instruments illustrated and described herein as embodying the invention are utilized in axially aligning the opposed spindles of a boring machine, it is to be understood that they may be adjusted to confirm any other predetermined relationship of the spindles and that they may likewise be utilized to establish or verify the relative positions of various other objects with equal facility.

The foregoing and other objects and advantages of the present invention will become more fully apparent from the following detailed description of the exemplifying embodying apparatus shown in the accompanying drawings, in which.

For the purpose of clearly illustrating the method and apparatus used in verifying accurate alignment of a plurality of adjustable machine elements in accordance with this invention, exemplary aligning apparatus is shown in the accompanying drawings applied to a boring and milling machine of the double opposed spindle type, the particular machine there depicted being more fully described in the copending application of Joseph B. Armitage and Orrin W. Barker, Serial No. 680,256, filed June 28, 1946, which issued as U. S. Patent No. 2,605,678 on August 5, 1952.

Figure 1:
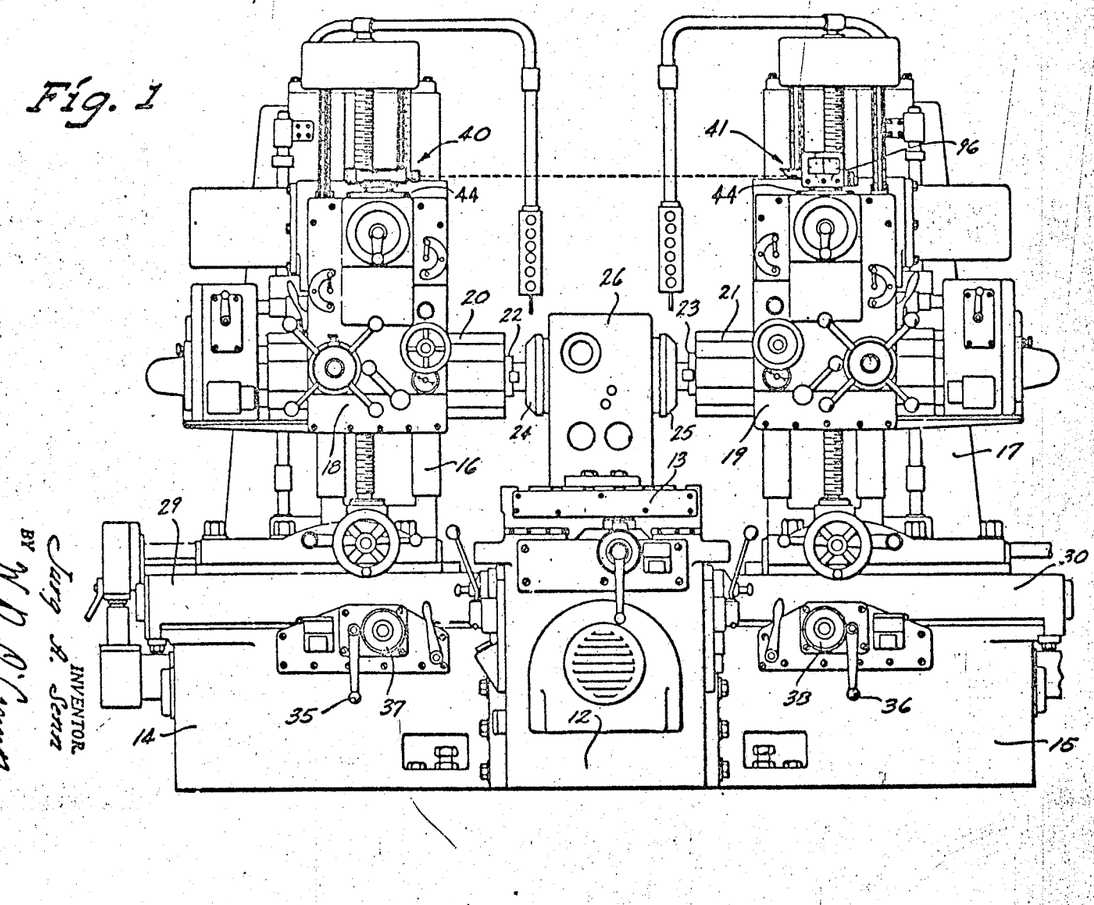
Figure 1 is a general view in end elevation of a combined boring and milling machine provided with a pair of cooperative aligning instruments embodying the present invention for accurately aligning a pair of adjustable tool supporting elements on the machine.

The boring and milling machine chosen for illustrative purposes and shown generally in Fig. 1 of the accompanying drawings, comprises essentially a hollow bed or base 12 constituting the main frame of the machine and carrying a work supporting table 13 arranged for longitudinal reciprocatory movement. A pair of bed extensions 14 and 15 project laterally from opposite sides of the bed 12 and serve to support left and right upstanding columns or uprights 16 and 17, respectively. The columns 16 and 17 are disposed at opposite sides of the work supporting table 13 and they serve to carry spindle supporting heads 18 and 19, respectively, each of the spindle heads being arranged for independent vertical sliding movement along ways formed on the forward vertically disposed face of its supporting column. Rams 20 and 21 respectively mounted in each of the spindle heads 18 and 19 for axial sliding movement toward or from each other, in turn support rotatably mounted tool carrying spindles 22 and 23. The tool spindles are thus operatively supported in opposed relationship in manner to engage cutters 24 and 25 mounted on the respective spindles with the opposite sides of a workpiece 26 carried by the table 13.

The positions of the cutters 24 and 25 may be adjusted in vertical direction by moving the spindle heads 18 and 19 vertically along their respective columns as required. Adjustment of the cutters 24 and 25 toward or from the workpiece 26 may be effected by advancing or retracting the respective supporting rams 20 and 21 through sliding them in or out of the spindle heads. In adapting the machine to operate on workpieces of various sizes, further adjustment of the cutters toward or from each other may be effected by moving the columns 16 and 17 along the bed extensions 14 and 15, toward or from the table 13 as may be required.

Figure 2:
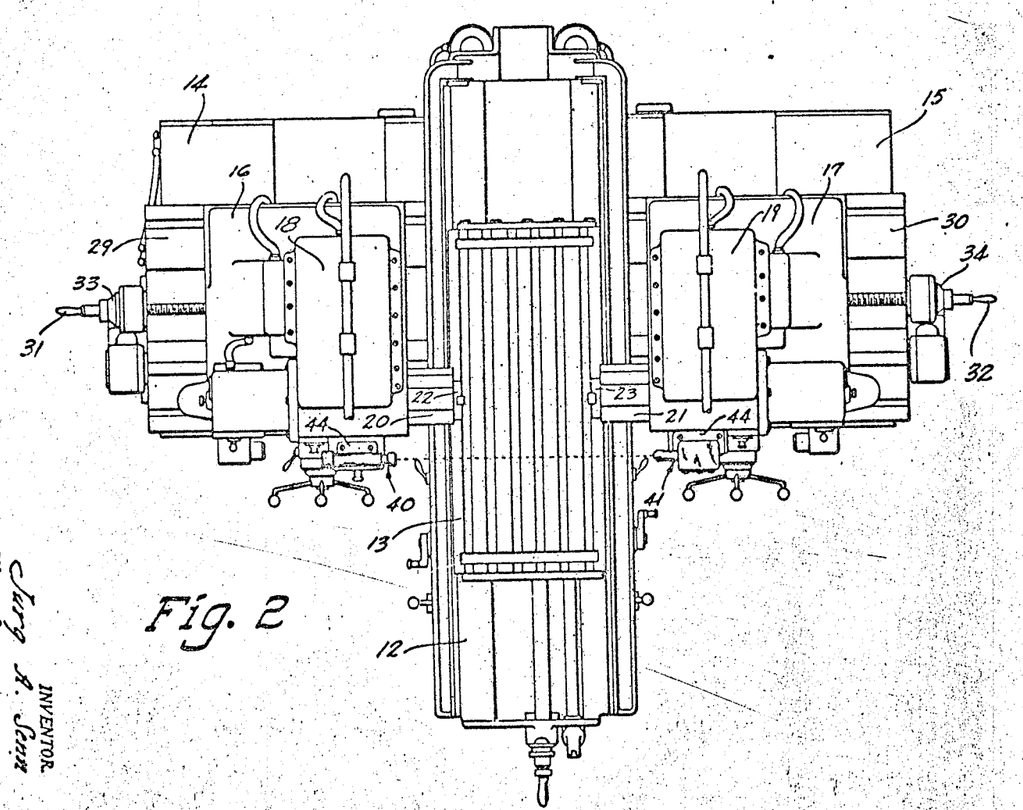
Fig. 2 is a plan view of the machine showing the tool supporting elements disposed in alignment in a vertical plane and with the aligning instruments respectively mounted thereon in manner to precisely indicate horizontal alignment therebetween.

In order that the cutters 24 and 25 may be caused to operate simultaneously in various desired combinations of positions on opposite sides of the workpiece 26, provision is made for effecting a further adjusting movement in direction mutually transverse to the vertical and the lateral movements. This is accomplished by providing for movement of the supporting columns 16 and 17 in direction longitudinally of, or parallel with the table 13. To this end, the columns 16 and 17 are supported upon the bed extensions 14 and 15, respectively, by means of saddles 29 and 30 slidably interposed therebetween. As shown in Figs. 1 and 2, the columns are slidably mounted upon the saddles 29 and 30 for movement toward or from the table 13, while the saddles in turn are slidably mounted upon the bed extensions 14 and 15, respectively, for movement parallel with the table 13.

Lateral movement of the columns 16 and 17 along the saddles 29 and 30 toward or from the table may be effected by turning hand cranks 31 and 32 at the outer ends of the saddles. Micrometer dials 33 and 34 operatively associated with the hand cranks 31 and 32, respectively, are provided for indicating the extent of lateral movement of the columns along the saddles. In a similar manner, movement of the saddles 29 and 30 longitudinally along the bed extensions 14 and 15, in direction parallel with the table 13, may be effected by rotating hand cranks 35 and 36, respectively. Micrometer dials 37 and 38 operatively associated with the hand cranks 35 and 36 are provided to indicate the extent of longitudinal movement of the saddles along the bed extensions. As more fully explained in the aforementioned U. S. Patent No. 2,605,678, each of the column hand cranks 31 and 32, as well as the saddle hand cranks 35 and 36, actuates a separate screw and nut mechanism to effect the desired movement of the columns 16 and 17 or the saddles 29 and 30, respectively.

In operating a combined boring and milling machine of this type, it is frequently desirable to perform machining operations simultaneously upon opposite sides of a workpiece mounted on the table in order to effect coordinated results, such for instance as are required in turning or boring aligned trunnions or sockets on the opposite sides of a workpiece. For this purpose, it is important that the two opposed tool spindles 22 and 23 be brought into predetermined relationship, for instance axial alignment, and that their relationship be maintained within prescribed limits of accuracy throughout the machining operation.

In like manner, the machining operations to be performed simultaneously on opposite sides of a workpiece may include the boring of holes having center distances offset one from the other. It may also be necessary to bore a series of holes on one side of the workpiece using a single hole on the opposite face of the workpiece as a reference or locating point. In either event, it may be advantageous to move the spindles into direct axial alignment first, and from the reference point thus established, move one or the other of the spindles in a horizontal or a vertical plane or both to the required relative position. After verifying the axial alignment of the spindles with reference to a point on one face of the workpiece, the one of the spindles to be moved may be displaced a measured distance therefrom by utilizing a system of measuring rods in combination with dial indicators built into the machine.

In addition to boring operations, the machine illustrated in Figs. 1 and 2 also may be used to perform milling operations on the opposite faces of the workpiece 26 mounted on the table 13. To accomplish this, face milling cutters such as the cutters 24 and 25 mounted on the tool spindles 22 and 23, may be moved under power in a plurality of mutually transverse planes, as may be required in manner to engage the opposed faces of the workpiece 26, as is more fully explained in the aforementioned U. S. Patent No. 2,605,678. Likewise, the face milling cutters mounted on the spindles 22 and 23 may be predeterminately positioned as required, in such manner that cutting operations in a horizontal plane may be performed on the opposed faces of the workpiece 26 as the work supporting table 13 is moved in longitudinal direction therebetween. In order to achieve maximum cutting efficiency, it is necessary that the rotational rate of cutter speed be coordinately adjusted with respect to the feeding rate of the cutters along the opposed faces of the workpiece. It is also necessary that the opposed cutter spindles 22 and 23 be retained in exact parallelism throughout the entire course of the machining operation to maintain accuracy and to obtain the best finish on the machined surfaces. Excessive cutter thrust may effect deflection of the cutter spindles 22 and 23 from exact parallelism and necessitate readjustment of the rotational cutter speed as well as the work feeding rate. For example, with the cutter spindles axially aligned and being fed downward in a vertical plane to perform a face milling operation on the workpiece 26, an excessive feeding rate might result in an upward tilting of the spindles out of parallelism. Such deviation from parallelism may go undetected until damage results, unless means are provided for continually checking the alignment of the spindles.

In accordance with the principles of the present invention, the alignment of the opposed spindles 22 and 23 may be checked at any time, regardless of intervening workpieces and whether or not the machine is in operation. To this end, photoelectric means are provided and arranged to operate in manner to detect the slightest deviation from alignment of the spindles.

The apparatus incorporating the invention operates to insure correct alignment of the spindles when the cutters are being applied to the opposite sides of a workpiece and also serves as a constant check during a machining operation to detect any departure from exact alignment. Whenever misalignment is indicated, corrective measures may be taken immediately to re-establish the alignment, by readjusting the positions of the spindles or by changing the cutter speed or the rate of feeding movement to reduce cutter thrust and obviate excessive deflection of the cutter supporting structure. Conversely, under favorable circumstances, the cutter speed and feeding rate may be increased to achieve maximum efficiency without fear of causing undetected misalignment of the spindles.

Initial alignment of the spindles 22 and 23 may be effected in well known manner by applying suitable precision measuring instruments and gauges to the machine and then fitting the machine parts by scraping the ways and making other adjustments to insure parallelism and axial alignment of the spindles. After accurate alignment of the spindles has been established in a vertical plane and in a horizontal plane by these methods and accurate parallelism therebetween effected, the exact axial alignment of the spindles may be verified at any time by means of the aligning apparatus embodying the invention.

This is accomplished by means of apparatus including a suitable light beam projector mounted on one of the spindle heads and disposed to project a beam of light outwardly toward a cooperatively operable light receiving or target instrument mounted on the other of opposed spindle head. The operative axes of the light beam projector and the light beam receiver are each carefully adjusted to be disposed exactly parallel with the axis of the tool spindle respectively associated therewith. When the tool spindles have been brought into axial alignment, the projector and receiver will likewise be in axial alignment and an electrical metering instrument or galvanometer arranged to be electronically actuated by the light beam receiver will provide a visual indication thereof. In the event movement of the tool spindles into a final position of axial alignment has not been accomplished with exactness, the metering instrument is arranged to indicate the degree of misalignment in terms of linear measure. Thus, the final manually effected adjustment of one tool spindle into precise alignment with the other may be made in accordance with the indicated linear measure of the exact amount of movement required.

The preferred form of the apparatus for effecting or verifying alignment of the opposed tool carrying spindles comprises a light projector 40 disposed in opposed relationship to a light receiving instrument 41, the instruments being mounted in corresponding relative positions on the tops of the spindle carrying heads 18 and 19, respectively, as shown in Figs. 1 and 2. As will hereinafter be more completely explained in connection with drawings of a modified form of the present aligning apparatus, one pair of similarly associated aligning instruments may incorporate means for verifying the alignment of two objects, the tool spindles 22 and 23 for example, in mutually transverse planes. However, the particular instruments shown in Figs. 1 and 2 are of a simplified type especially adapted to align the tool spindles 22 and 23 in a horizontal plane only. A second pair of like aligning instruments (not shown) may be mounted on the spindle heads 18 and 19, respectively, if desired in addition to the instruments 40 and 41 for effecting alignment of the tool spindles 22 and 23 in a vertical plane also.

Assuming for illustrative purposes that the tool spindles 22 and 23 have been predeterminately positioned in the same vertical plane, they may be relatively elevated or lowered into horizontal alignment as may be required. With the instruments 40 and 41 properly adjusted and energized, light from the projector 40 will be directed outwardly in a beam parallel to the axis of the tool spindle 22 toward the light receiver 41. Light received by the instrument 41 from the projector 40 operates to effect actuation of a galvanometer contained therein in such manner that the indicating needle thereof is moved to a central position of zero registration at the exact moment that the tool spindles 22 and 23 are moved into precise horizontal alignment. With the tool spindles 22 and 23 thus positioned in horizontal alignment, any subsequent movement of the indicating needle from its zero position will provide a visual indication of a deviation from horizontal alignment and indicate that the proper corrective measures should be effected to readjust the movable machine elements.

Figures 3, 4, 5:
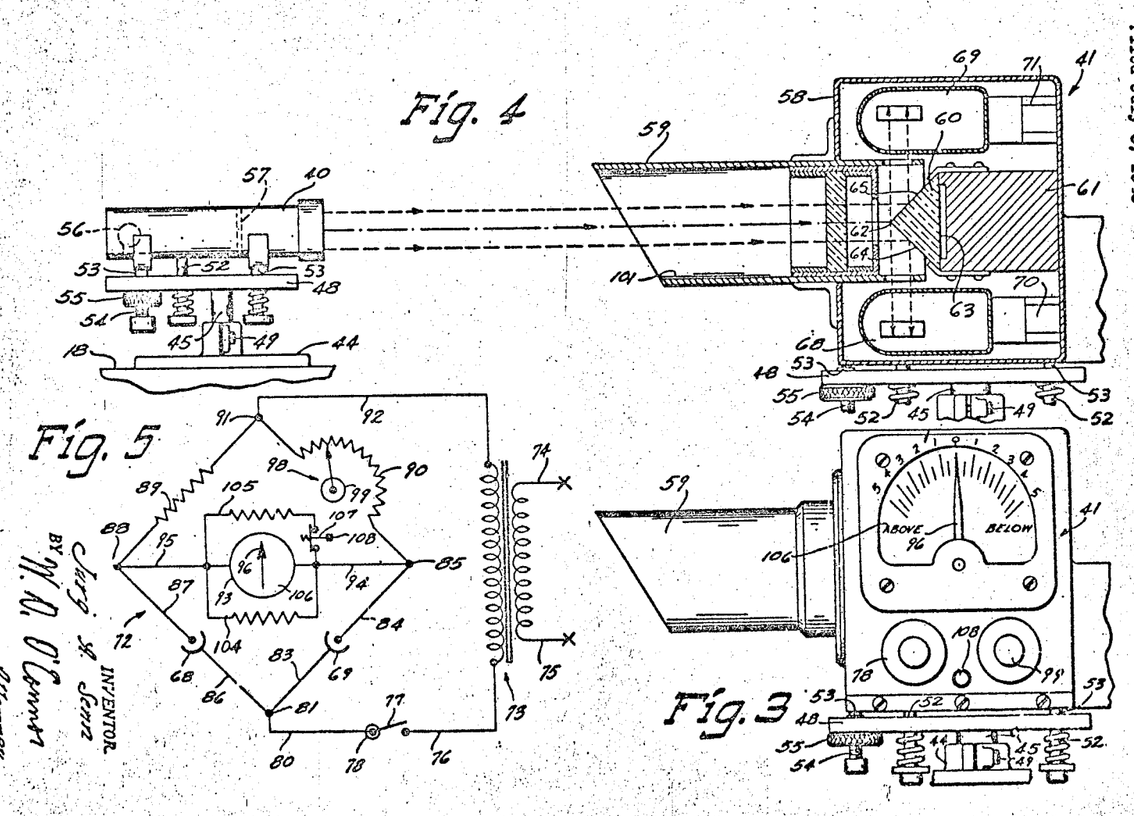
Fig. 3 is an enlarged view in side elevation of the combined prismatic, electronically actuated aligning device or target instrument, together with its adjustable supporting base.
Fig. 4 is an enlarged view of the cooperating instruments with the light projector instrument, and its adjustable supporting base shown in side elevation and disposed in precise horizontal alignment with the associated aligning or target instrument of Fig. 3 which is here shown in vertical section, together with its adjustable supporting base.
Fig. 5 is an electrical circuit diagram comprising a Wheatstone bridge circuit adapted to measure the relative activation of a pair of light sensitive phototubes incorporated in the target instrument.

As a prerequisite to accurate operation, it is necessary that the operative axis of the aligning instruments 40 and 41 be in exact parallelism with the respectively associated tool spindles 22 and 23 and exactly positioned relative to them. To this end, both the light projector 40 and the light receiver 41 are carried by similar adjustable mounting brackets 44 securely bolted to the spindle carrying heads 18 and 19, respectively, as shown in Figs. 1, 3 and 4. Each of the brackets 44 is provided with a socket adapted to receive a shaft 45 for rotatable or vertically slidable movement. The shaft 45 supports a mounting plate 48 to which in turn the aligning instrument respectively associated therewith is adjustably secured. The bracket 44 is provided with a kerf adapting the socket to be contracted by a clamping bolt 49 to grip the shaft 45 and prevent angular displacement of it after the instruments 40 and 41 have been moved into their adjusted positions.

The instruments 40 and 41 may also be adjusted angularly in a vertical plane by reason of being secured to each of the mounting plates 48 for selective, vertical tilting movement. To this end, a stud 52 secured to each of the instruments 40 and 41 extends through each of the mounting plates 48, respectively, and is provided with a spring operating in manner to resiliently urge the aligning instrument associated therewith downward in direction of the mounting plate against three steel balls 53 interposed therebetween in triangular relationship to form a three point mounting. Two of the balls 53 are partially socketed in semi-spherical cavities formed in the mounting plate 48 and its associated aligning instrument, while the third ball is socketed in a semi-spherical cavity contained in the upper end of an adjusting screw 54 threadably engaging the mounting plate 48. Thus, rotating the adjusting screws 54 leftward or rightward effects an upward or downward tilting movement of the instruments 40 and 41, as may be required. Jam nuts 55 are provided to lock the adjusting screws 54 against the mounting plate 48 in order to retain the instruments 40 and 41 in their adjusted positions.

Although for the most effective use of the aligning apparatus herein described, the projection of light in a beam of symmetrical cross sectional intensity is preferred, the light beam may be of either cylindrical, rectangular or other form. However, a symmetrical light beam is especially desirable because it facilitates measuring the extent of any departure of the light source from alignment with the target instrument. For maximum efficiency and sensitivity, the preferred type of light source is one that provides the most brilliant light with the smallest possible diameter, constituting in effect a point source of light in order to reduce to a minimum the luminous losses due to dispersion and diffusion.

As shown in Fig. 4, the light projector 40 comprises an outer tubular body structure that has mounted therein an incandescent lamp 56 arranged to project light outwardly through a condensing lens 57 toward the light receiving instrument 41 in a compact beam, as indicated by the dotted lines.

The light receiving or target instrument 41 comprises a housing 58, having a tubular structure 59 extending outwardly in direction toward the light projector 40, the housing 58 being arranged to contain the required optical and electronic indicating apparatus in one unitary apparatus, as best shown in Fig. 4. An optical prism 60 is adjustably secured within the housing 58 by means of a mounting bracket 61 in manner to exactly divide the beam of light focused outwardly from the light projector 40 whenever the prism is in exact horizontal alignment therewith. The prism 60 is so mounted that the apex 62 thereof is in a horizontal plane and the base 63 is disposed perpendicular to the beam of light emanating from the projector 40 and parallel to the vertical lines along which the instruments 40 and 41 are movable. When the light receiving instrument 41 and the prism 60 contained therein are in exact horizontal alignment with the light projector 40, the beam of light projected therefrom will be exactly divided by the prism apex 62 into two light beams of equal intensity. As indicated by the dotted lines in Fig. 4, the divided light beams will then be reflected at right angles outwardly in diametrically opposed directions from the inclined faces 64 and 65 of the beam dividing prism 60.

Two phototubes 68 and 69 of approximately equal sensitivity, are operably mounted in receptacles 70 and 71, respectively, in the same vertical plane within the housing 58 and in such manner that each of the phototubes is equidistant from the prism 60. Each of the phototubes 68 and 69 is adapted to intercept and be activated by a reflected beam of light from the associated angularly inclined face of the prism 60, the relative degree of excitation of the phototubes being in direct proportion to the relative intensity of the light beams reflected thereon. Whenever the projector 40 is in exact horizontal alignment with the light receiving instrument 41, the prism 60 contained therein will divide the projected light beam into two light beams of equal intensity to effect an equalized activation of the phototubes 68 and 69.

As shown diagrammatically in Fig. 5, the relative degree of excitation of the phototubes 68 and 69 is measured by a Wheatstone bridge circuit 72 that is energized from the transformer 73 which, in turn, is energized by means of line conductors 74 and 75. From the transformer 73, current flows through a conductor 76 to one contact of a normally open switch 77 which may be manipulated to a closed position by rotating a control knob 78, as shown in Fig. 3. With the switch 77 in closed position, the flow of current continues through a conductor 80 to a junction 81 of the Wheatstone bridge circuit 72. The phototube 69 is connected to junction 81 by a conductor 83 and another conductor 84 connects it to junction 85 of the bridge circuit to form one of the variable resistance branches thereof. The phototube 68 is likewise connected by conductors 86 and 87 between junctions 81 and 88 to form the other variable resistance branch. Fixed resistance branches are constituted by conductors 89 and 90, respectively, which connect junctions 88 and 85 to junction 91 from which the circuit is completed to the transformer 73 by a conductor 92.

Each of the phototubes 68 and 69 provides minimum resistance when it is exposed to and activated by a maximum of light reflected from the angularly opposed faces of the prism 60. Conversely, the phototubes 68 and 69 provide maximum resistance when they are in a quiescent state, that is, not being activated by any light reflected from the prism 62. Each of the fixed branch conductors 89 and 90 is arranged to afford an equalized non-variable resistance which may be equivalent to either the maximum or the minimum resistance afforded by each of the phototubes 68 and 69, respectively. Inasmuch as the degree or level of resistance afforded by the non-varying branches is immaterial providing the resistance of each non-varying branch is equal to the other, it is contemplated that, in the preferred embodiment of the electrical circuit illustrated in Fig. 5, each of the non-varying branches 89 and 90 will provide a resistance equivalent to the maximum resistance afforded by each of the variable resistance branches constituted by the phototubes 68 and 69, respectively.

For measuring the degree of unbalance between the variable resistance branches constituted by phototubes 68 and 69, a sensitive galvanometer type electrical instrument 93 is connected by the conductors 94 and 95 to constitute a bridge between the junctions 85 and 88. Thus, any degree of unbalance between the variable resistance branches effectuated by an unbalanced activation of the phototubes 68 and 69 interconnected therewith will be indicated by an indicating needle 96 of the meter 93 in a manner similar to the well known operation of the conventional Wheatstone bridge circuit. Likewise, the indicator needle 96 will be moved to a centralized zero position whenever a balanced resistance is provided by an equalized activation of the phototubes 68 and 69.

Although it is contemplated that the conductors 89 and 90 will afford fixed non-varying resistances to currents flowing from junction 81 through the bridge circuit to junction 91, it may be necessary to reequalize the fixed resistance afforded by these two conductors or it may be advantageous to create a predetermined degree of unbalance in the circuit. To accomplish this purpose, the conductor 90 includes a rheostat 98 adjustable by a control knob 99. As heretofore explained, the rheostat 98 is normally adjusted in position to afford a non-varying resistance equivalent to the resistance offered by the non-varying resistance branch 89.

Referring to Figs. 4 and 5, it will be apparent that with the Wheatstone bridge circuit 72 operatively energized, any diffused light entering the tubular opening 59 will be reflected by the prism 60 to effect activation of the phototubes 68 and 69. Thus, even natural daylight might cause phototube excitation with the resultant movement of the meter indicator 96. To obviate this difficulty, the inner surface 101 of the tubular structure 59 is coated with a light absorbent paint.

In effecting an aligning operation, as the energized light projector 40 is parallelly displaced toward horizontal alignment with the light receiving instrument 41, the full light beam intensity will be directed initially toward one of the reflective surfaces of the prism 60. A correspondingly intense beam of light reflected from the illuminated angularly inclined face of the prism 60 will effect maximum activation of the associated phototube to provide a maximum degree of unbalance in the Wheatstone bridge circuit 72. As a result, the indicator 96 of the meter 93 will be moved from its neutral position of zero registration to the limit of its pivotal movement. Continued displacement of the projector 40 toward its ultimate position of exact horizontal alignment with the light beam receiving instrument 41 will produce intermediate gradations of unbalance in the Wheatstone bridge circuit 72 with a reactive movement of the indicating needle 96 of the electrical meter 93 toward its position of zero registration. Concomitantly with the final displacement of the projector 40 into horizontal alignment with the light receiver 41, the indicator needle 96 will be moved to its zero position.

With the electrical meter 93 operating at its full sensitivity in the manner just explained, however, it would have to absorb the impact of an immediate maximum condition of unbalance in the bridge circuit 72 as the full light beam falls on one face of the prism. In addition to this, the range of movement in which the approximate horizontal alignment between the light beam projector 40 and the light receiving instrument 41 may be indicated is restricted by the allowable pivotal movement of the indicator needle 96. To obviate the possibility of damaging the sensitive meter and to lessen the impact of an instantaneous bridge unbalance thereon, two corrective shunts 104 and 105 are connected by means of the branch conductors 94 and 95 to the junctions 85 and 88, respectively, to by-pass a predetermined amount of current around the meter 93. With the dial 106 of the meter 93 calibrated in units of linear measure, use of the instrument with only the corrective shunt 104 permits movement of the indicator needle 96 to be read in units of ten-thousandths of an inch, this reading being proportionate to the actual measure of misalignment existing between the projector 40 and the receiver 41. The second shunt 105 is arranged to further desensitize the action of the meter 93 and to modify the effect of the indicator needle movement to permit a direct reading of the calibrations on the dial 106 in thousandths of an inch.

As shown in Fig. 5, a disconnecting switch 107 is resiliently retained in a normally closed position to maintain the corrective shunt 105 connected with the conductors 94 and 95. Since the shunt 104 is always connected with the conductors 94 and 95, with the shunt 105 also connected, the indicator needle 96 is normally operative to indicate the approximate degree of horizontal alignment between the light projector 40 and the light receiving instrument 41 within one one-thousandth of an inch. After the initial, approximate horizontal alignment has been obtained, an operating button 108 on the switch 107 may be depressed to disconnect the shunt 105. Holding the switch button 108 in disconnected position effectuates a more sensitive operation of the meter 93 to allow the final movement of the projector and receiver into horizontal alignment within accuracy limits of one ten-thousandth of an inch.

In operation of the aligning apparatus illustrated in Figs. 1, 2 and 4, movement of the light projector 40 into horizontal alignment with the light receiver 41 is accomplished by a selective movement of the spindle heads 18 and 19, respectively associated therewith in a vertical plane. As hereinbefore explained, the positioning of the projector 40 and receiver 41 in horizontal alignment indicates a coordinated positioning of the tool spindles 22 and 23 in horizontal alignment. After the tool spindles 22 and 23 and their associated indicating instruments 40 and 41, respectively, are moved into accurate horizontal alignment, any deviation therefrom will effect a movement of the indicating needle 96 from its zero position. Verification or rechecking of the alignment may be accomplished at any time by a direct visual inspection of the meter 93, reading the calibrations on the dial 106 in thousandths of an inch. A more accurate verification may be made by again depressing the range button 108 to increase the sensitivity of the meter and permit a direct reading of the calibrations in ten-thousandths of an inch.

Vertically parallel displacement of the tool spindles 22 and 23 into horizontal alignment is precisely indicated by the light projector 40 and the receiving instrument 41 in which the light beam dividing prism 60 is mounted in such manner that its apex 62 lies in a horizontal plane normal to the plane in which the spindles are vertically movable, as shown in Figs. 1 and 4. As hereinbefore explained however, horizontally parallel displacement of the tool spindles 22 and 23, either into or away from a position of vertical alignment, may also be effected by an appropriate movement of the supporting column members 16 and 17 longitudinally parallel to the table 13 along the supporting saddles 29 and 30, as shown in Figs. 1 and 2. For indicating precisely the vertical alignment of the tool spindles, another pair of aligning instruments (not shown), identical in construction to the light projector 40 and the light receiver 41, may be similarly mounted for cooperative operation therewith on the opposed spindle heads 18 and 19. However, in this instance, the apex of the prism mounted within the light receiver arranged to indicate vertical alignment would be positioned in a vertical plane instead of in a horizontal plane as is the apex 62 of the prism 60 mounted within the receiving instrument 41.

Figure 6:
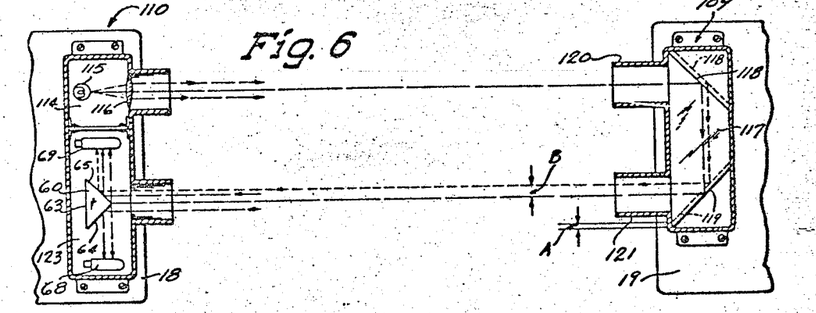
Fig. 6 is an enlarged vertical sectional view of a pair of cooperative aligning instruments illustrating a modified form of the invention.

A modified form of the aligning apparatus, illustrated in Fig. 6, comprises a prismatic reflective instrument 109 and a combined light projecting and light receiving instrument 110, the instruments being adapted to be mounted on objects 18 and 19, respectively, for vertically parallel movement therewith and for cooperative operation in verifying or checking the horizontal alignment therebetween. With the spindle carrying heads 18 and 19, as shown in Figs. 1 and 2 for example constituting relatively movable supporting members, the instruments 110 and 109 respectively mounted thereon may be relatively moved in the same vertical plane by an appropriate movement of the spindle supporting heads in manner to indicate horizontal alignment between the spindles 22 and 23. As shown in Fig. 6, the instruments 109 and 110 are in positions of horizontal alignment to indicate a corresponding horizontal alignment between the vertically movable supporting members 18 and 19. A light beam projector 114 contained within the instrument 110, comprises essentially an incandescent light source 115 and a condensing lens 116 arranged to focus a symmetrical beam of light outwardly toward the cooperatively mounted, relatively movable reflective instrument 109. A prism 117 mounted within the instrument 109 has its angularly inclined opposed surfaces 118 and 119 silvered to reflect light and operatively disposed in relation to tubular apertures 120 and 121, respectively, in manner to receive a beam of light from the projector 114 and to transmit a reflected beam of light toward a light receiving or indicating instrument 123, also contained within the instrument 110.

The indicating instrument 123 is similar to the instrument 41 hereinbefore explained, the light beam dividing prism 60 being mounted within the instrument 110 in such manner that the angularly inclined reflective faces 64 and 65 thereof are equally distant from the corresponding light activated phototubes 68 and 69, respectively. The phototubes 68 and 69 are arranged to constitute variable resistance branches of the Wheatstone bridge circuit 72 provided with the electrical metering instrument 93 to measure the relative degree of phototube excitation as hereinbefore explained, and as shown in Fig. 5. With the instruments 109 and 110 in exact horizontal alignment as shown in Fig. 6, light from the incandescent source 115 will be projected outwardly toward the angularly inclined reflective face 118 of the prism 117 from which in turn it will be reflected at right angles toward the oppositely inclined face 119. From the reflective face 119, the light beam will again be reflected at right angles back toward the light receiving or indicating instrument 123 in a beam parallel to the light beam emanating from the light projector 114 and as indicated by the broken lines in Fig. 6. The light indicating beam reflected from the face 119 of the prism 117 will then be divided by the prism 60 into two light beams of equal intensity which, in turn, will be reflected by the angularly inclined faces 64 and 65 thereof to effect an equalized activation of the phototubes 68 and 69, respectively. As hereinbefore explained, the equalized activation of the phototubes 68 and 69 will provide a balanced resistance in the Wheatstone bridge circuit 72, as shown in Fig. 5, to effect a movement of the indicator needle 96 to a centralized zero position for indicating an exact horizontal alignment between the instruments 109 and 110 as shown in Fig. 6.

A primary advantage afforded by this modified form of the invention is the increased or amplified sensitivity in determining the alignment between the instruments 109 and 110, or in measuring the degree of misalignment existing therebetween. The corresponding horizontal alignment or degree of misalignment between the relatively movable supporting members 18 and 19 may thus be determined with the utmost accuracy. The increased sensitivity of the aligning apparatus illustrated in Fig. 6 results from the double reflection of the light beam emanating from the light projector 114 by the angularly inclined reflective surfaces 118 and 119, respectively, in the course of the light beam being reflected by the prism 117 in a final or indicating beam directed toward the electronically actuatable indicating apparatus 123. For each increment of vertical displacement of the reflective instrument 109 relative to the indicating instrument 110, there will be a doubled displacement of the final or indicating light beam reflected from the angular face 119 of the prism 117 toward the light beam dividing prism 60. For example, with the dotted lines 118 and 119 portraying the opposed angularly inclined faces of the prism 117 vertically displaced upward from its position for indicating exact horizontal alignment with the instrument 110 by a distance indicated by the letter A, the light beam emanating from the projector 114 will be reflected along a different course, as indicated by the dotted line extending between the vertically displaced angular faces of the prism 117 to be directed toward the angularly inclined face of the prism 65 for activating the phototube 69. The relative displacement of the indicating light beam shown by the broken line to a new position shown by the dotted line and as represented by the letter B, will be exactly twice as great as the upward vertical displacement of the prism 117 as represented by the distance A. It will be apparent therefore that the slightest deviation of either the instrument 109 or the instrument 110 from exact horizontal alignment position will induce an amplified relative movement of the indicating light beam reflected from the face 119 of the prism 117 to effect a proportionally amplified unbalanced activation of the phototubes 68 and 69. As hereinfore explained, the unbalanced activation of the phototubes 68 and 69 will be visually reflected by the electrical meter 93 to indicate the exact degree of misalignment between the instruments 109 and 110, as shown in Fig. 5.

Figure 7:
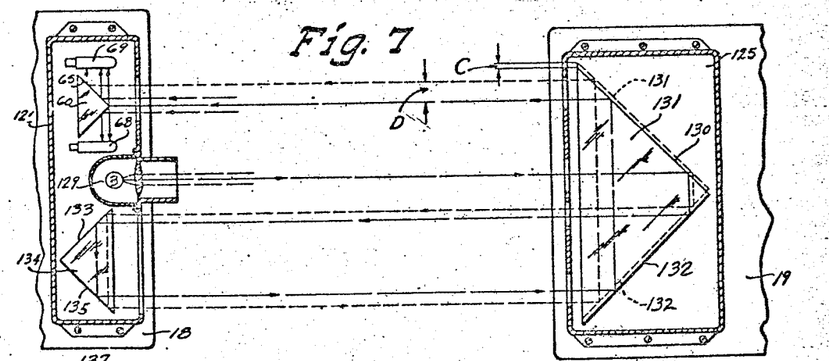
Fig. 7 is an enlarged vertical sectional view of another pair of cooperative aligning instruments constituting another modified form of the invention.
Figure 8:
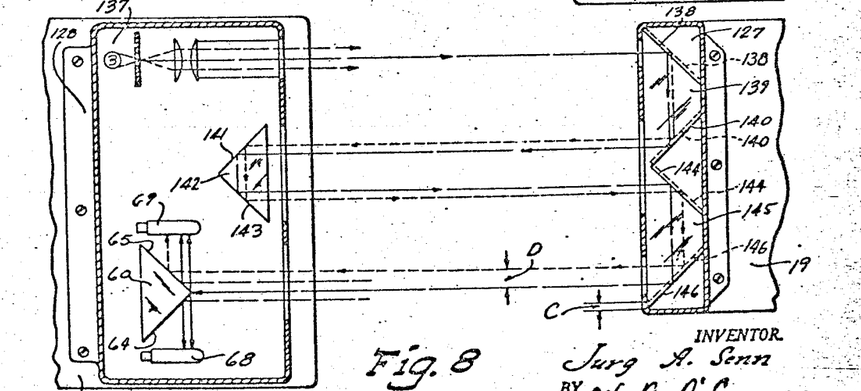
Fig. 8 is an enlarged vertical sectional view of still another pair of aligning instruments constituting a further modified form of the invention.

Further modified forms of the invention are diagrammatically represented in Figs. 7 and 8, respectively, in which combined light projecting and light indicating instruments 126 and 128, and coordinately operable light reflecting instruments 125 and 127, are adapted to be mounted on parallelly movable supporting objects for verifying or checking the alignment therebetween. Each pair of the aligning instruments represented by Figs. 7 and 8, respectively, is adapted to provide a still further degree of sensitivity in either moving two relatively movable objects into exact horizontal alignment or in measuring the degree of misalignment therebetween. A light beam emanating from the projecting instrument 126 or 128, is directed outwardly toward the reflective instrument 125 or 127, in a beam parallel to the operative axis of the relatively movable supporting objects 18 and 19, respectively, to be reflected back toward an intermediate prism contained in the light projecting instrument 126 or 128. From the intermediate prism, the light beam is again reflected back toward the reflective instrument 125 or 127, from which it is reflected in a final or indicating light beam toward an indicating device in the instrument 126 or 128. The prisms in the reflective instrument 125 or 127, as well as the intermediate reflective prism in the light projecting instrument 126 or 128, are arranged in manner that the light beams intermediately reflected therebetween are in axially parallel relationship both with the light beam originally emanating from the projecting instrument 126 or 128, as well as with the final or indicating light beam directed toward the indicating device contained therein. For each increment of displacement of the projecting instrument 126 or 128, relative to the reflective instrument 125 or 127, there will be a quadrupled relative displacement of the final or indicating light beam directed toward the indicating device mounted in the instrument 126 or 128, to effect an amplified sensitivity in verifying the horizontal alignment between the instruments.

As shown in Fig. 7, light from a projector 129 mounted within the instrument 126, is directed outwardly toward an angularly inclined, silvered reflective face 130 of a prism 131, contained within the reflective instrument 125, from which it is reflected at right angles toward the oppositely inclined silvered reflective face 132 thereof, as indicated by the broken lines. From the face 132, the light is then reflected back toward an angularly inclined, silvered face 133 of an intermediate prism 134 mounted within the instrument 126. The light is then reflected toward an oppositely inclined face 135 and again reflected back toward the angularly inclined face 132 of the prism 130. From the face 132, the light is again reflected at right angles toward the face 130 from which it is reflected in a final or indicating light beam toward the beam dividing prism 60, contained within the instrument 126 and which operates to divide the indicating light beam into two light beams and reflect them outwardly to effect activation of the phototubes 68 and 69, respectively. As hereinbefore explained and as shown in Fig. 5, equalized activation of the phototubes 68 and 69 operates a meter 93 to afford a visual indication of an exact horizontal alignment between the aligning instruments and the relatively movable supporting objects associating therewith.

In the event the prism 131 is vertically displaced out of its original position for indicating horizontal alignment a measured distance as represented by the letter C and as shown by the dotted lines representing the angularly inclined faces 130 and 132 thereof, the light beam emanating from the projector 129 will be redirected along a new course as shown by the dotted lines to be reflected in a final or indicating light beam from the reflective face 130 toward the reflective face 65 of the beam dividing prism 60. Thus the indicating light beam, represented by the broken line as being reflected directly toward the apex of the prism 60, will be displaced upwardly to a new position represented by the dotted line to strike only the reflective face 65 of the prism 60, the displacement being indicated by the letter D. The relative displacement of the indicating light beam as represented by the letter D, is four times as great as the relative displacement of the prism 131, as represented by the letter C to afford an increased or amplified sensitivity in determining the exact horizontal alignment or degree of misalignment between the instruments 125 and 126.

As shown in Fig. 8, light from the projector 137 mounted within the instrument 128 is directed outwardly as indicated by the broken line toward an angularly inclined, silvered reflective face 138 of a prism 139 mounted within the instrument 127. From the face 138, the light beam is reflected at right angles toward an oppositely inclined reflective face 140 from which in turn it is reflected back toward the angularly inclined, silvered reflective face 141 of an intermediate prism 142 mounted within the instrument 128. Again the light beam is reflected at right angles from the face 141 toward an oppositely inclined reflective face 143 from which it is again reflected back toward an angularly inclined, silvered reflective face 144 of a second prism 145 mounted within the instrument 127. From the face 144, the light beam is reflected toward the oppositely inclined face 146 to be reflected back in a final or indicating light beam toward the apex of the light beam dividing prism 60 contained within the instrument 128. With the instruments 127 and 128 in exact horizontal alignment, the phototubes 68 and 69 will then be equally activated by two light beams of equal intensity reflected from the oppositely inclined reflective faces of the prism 60, as hereinbefore explained.

In the event the instruments 127 and 128 are relatively displaced from their position of horizontal alignment a measured distance, as shown by the letter C and as represented by the dotted lines portraying the angularly inclined faces of the prisms 145 and 139, the light beam emanating from the projector 137 will be redirected along a new course, as indicated by the dotted line, to be reflected from the angularly inclined face of the prism 145 toward the face 65 of the prism 60 contained in the instrument 128. The relative displacement of the indicating light beam represented by the broken line to a new position represented by the dotted line as shown by the distance D, will be four times as great as the relative displacement of the prisms 145 and 139, as represented by the distance C, to provide an increased or amplified sensitivity in determining the horizontal alignment between the instruments 127 and 128.

As diagrammatically represented in Fig. 8, the vertically parallel displacement of the indicating light beam, as shown by the broken line and the dotted line, respectively, directed toward the prism 60, will effect a change in the relative activation of the phototubes 68 and 69 with a resultantly unbalanced condition in the Wheatstone bridge circuit 72 shown in Fig. 5 to operate the meter 93 in manner to provide a visual indication of the exact degree of misalignment existing between the instruments 127 and 128.

Referring again to the modified forms of the aligning apparatus depicted in Figs. 6, 7 and 8, it will be apparent that each pair of relatively and parallelly movable aligning instruments comprises a combined light projecting and indicating instrument disposed in operable relationship with a reflective instrument adapted to receive light from the projecting instrument and redirect an axially parallel beam of light toward the indicating instrument. In each instance, one or more optical prisms having oppositely inclined reflective faces are mounted within the reflective instrument, shown as 109 in Fig. 6 and as 125 and 127 in Figs. 7 and 8, in manner to be interposed between the light source and the indicating instrument mounted within the cooperatively movable instrument shown as 110 in Fig. 6 and as 126 and 128 in Figs. 7 and 8.

For each pair of oppositely inclined reflective surfaces contained in the relatively movable reflective instruments 109 and 125, as shown in Figs. 6 and 7 respectively, there will be a doubled displacement of the final or indicating light beam directed outwardly from the reflective instrument for each corresponding incremental displacement thereof. This doubled displacement may be increased by adding additional pairs of reflective surfaces in the reflective instruments with appropriate interreflecting means in the cooperative light projecting and indicating instrument. Increased magnification, however, may be achieved by utilizing a plurality of prisms 139 and 145 shown in the reflective instrument 125 in Fig. 8 to provide two pairs of oppositely inclined reflective surfaces, for providing a quadrupled displacement of the final or indicating light beam emanating from the instrument 125 for each incremental movement thereof. Alternatively, as shown in Fig. 7, one prism 130 mounted in the reflective instrument 125 may be employed to provide one pair of reflective surfaces which are utilized twice to effect a quadrupled displacement of the indicating light beam for each incremental displacement of the reflective instrument 125. As indicated by the dotted lines and as hereinbefore explained, the light beam emanating from the source 129 is interreflected between the prism 130 and the prism 134 before being reflected in a final or indicating light beam toward the light beam dividing prism 60 of the electronic indicating instrument.

Figures 9, 10:
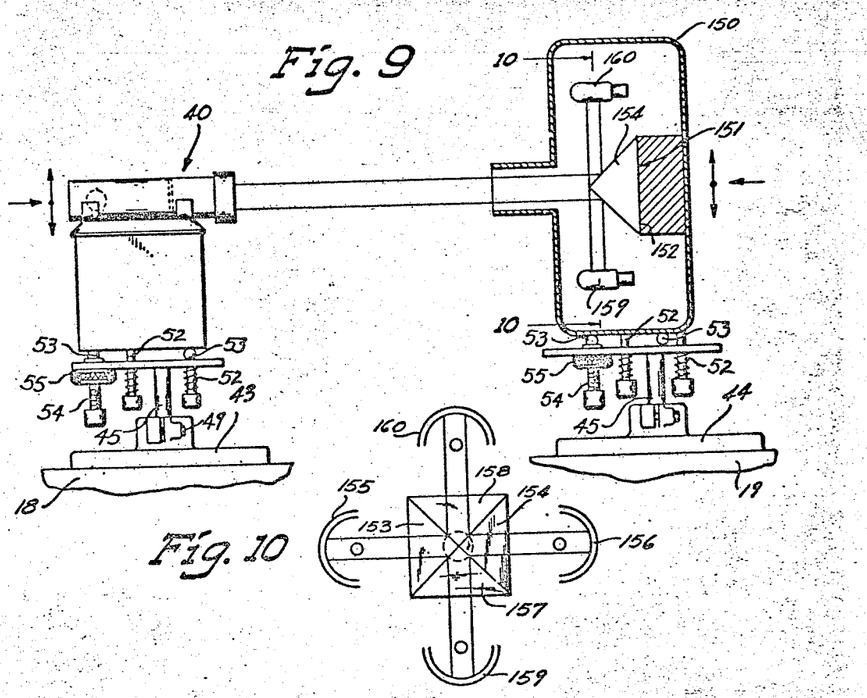
Fig. 9 is a view of another pair of modified instruments including a light projecting instrument, shown in left side elevation, in exact axial alignment with a light activated indicating instrument that is shown in vertical sectional view, and adapted to indicate axial alignment in a plurality of mutually transverse planes.
Fig. 10 is a somewhat diagrammatic view in vertically transverse section taken along the lines 10—10 in Fig. 9 and showing in plan view the pyramid prism in operative relationship with the four light activated phototubes; and, Fig. 11 is an electrical circuit diagram showing two Wheatstone bridge circuits connected to indicate the relative activation of the pairs of light sensitive phototubes shown in Fig. 10 that are respectively interconnected in each of the bridge circuits.

A further modified form of the invention comprises a pair of aligning instruments adapted to be individually mounted on each one of a pair of parallelly movable objects, the spindle carrying heads 18 and 19 shown in Figs. 1 and 2 for example, for cooperative operation in effecting or varying the alignment therebetween in mutually transverse planes. As shown in Fig. 9, the light projecting instrument 40 is arranged to project a light beam preferably of generally uniform circular cross sectional density, outwardly toward an electronically actuatable indicating instrument 150. The instruments 40 and 150 are secured to relatively movable work supporting spindle heads 18 and 19 by means of mounting brackets 43 and 44, respectively, for selective movement in both vertical and horizontal parallel planes by appropriate movements of the spindle heads 18 and 19 as hereinbefore explained in connection with the machine shown in Figs. 1, 2 and 9. A pyramid prism 151 is mounted within the instrument 150 in manner that its base 152 is perpendicular to the light beam emanating from the light projector 40 and parallel to the planes in which the instruments 40 and 150 are relatively movable. When the relatively movable spindle supporting heads 18 and 19, arranged to carry each of the instruments 40 and 150 respectively, are moved into exact horizontal and vertical alignment, the apex of the prism 151 will intercept the center of the light beam projected outwardly by the instrument 40. It is assumed as a necessary requisite to accurate operation, that each of the instruments 40 and 150 has been adjusted into precise parallelism, both with each other, and with the work spindles operatively carried by each of the parallelly movable supporting heads 18 and 19 which are to be aligned. With the instruments 40 and 150 moved into positions of both horizontal and vertical alignment, the light beam directed on the prism 151 will be divided and reflected from the four angularly inclined faces thereof into four light beams of equal concentration and density. As shown in Figs. 9 and 10, the prism 151 is so mounted that diametrically opposed triangular reflective faces 153 and 154 thereof will reflect light beams in a horizontal plane to activate phototubes 155 and 156, respectively, for verifying the vertical alignment between the instruments 40 and 150. In a similar manner, light beams are reflected in a vertical plane from diametrically opposed angularly inclined triangular faces 157 and 158 of the prism 151 in manner to activate phototubes 159 and 160, respectively, for verifying alignment between the instruments 40 and 150 in a horizontal plane.

Figure 11:
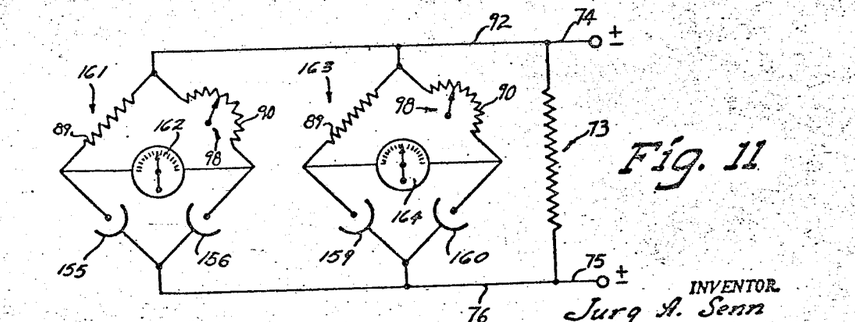

The phototubes 155 and 156 are electrically interconnected to constitute the variable resistance branches of a Wheatstone bridge circuit 161 similar to the circuit hereinbefore explained and as diagrammatically shown in Fig. 11. Thus, the relative degree of phototube activation is measurable by means of an electrical metering instrument 162, interconnected in the circuit 161 in well known manner, to provide a visual indication of the vertical alignment or degree of misalignment between the instruments 40 and 150. In like manner, the phototubes 159 and 160 are electrically interconnected to form the variable resistance branches of a Wheatstone bridge circuit 163 to operate an electrical meter 164 interconnected therein for verifying the alignment or measuring the degree of misalignment between the instruments 40 and 150 in a horizontal plane. Thus, in accordance with the relative positions of the instruments 40 and 150, the galvanometers 162 and 164 are simultaneously operative to indicate the precise alignment therebetween in both horizontal and vertical planes. It will be apparent that the galvanometers 162 and 164 also are coordinately effective to provide a visual indication of any degree of misalignment between the indicating instruments 40 and 150 in both horizontal and vertical planes.

From the foregoing description and explanation of illustrative apparatus embodying the invention, it is apparent that there has been provided convenient and relatively automatic apparatus for establishing and verifying the alignment of movable objects such as machine members and the like with facility and a high degree of accuracy.

Although the preferred form of the embodying apparatus has been described in considerable detail in fully disclosing a practical application of the invention, it is to be understood that the modified structures shown and various other modifications of the apparatus may be utilized to advantage without departing from the spirit and scope of the invention as defined in the subjoined claims.

The principles of the invention having now been fully explained in the foregoing description of embodying apparatus, we hereby claim as our invention:

1. In a milling machine of the type having opposed spindle heads mounted for vertically parallel movements in spaced apart planes, means for maintaining said spindle heads in axial alignment including precision locating means comprising light projecting means on one of said spindle heads in combination with light receiving means on the other of said spindle heads, light beam dividing prismatic reflecting means associated with said light receiving means, a plurality of phototubes arranged to cooperate with said prismatic reflecting means and adapted to receive varying concentrations of reflected light therefrom, electrical circuit means interconnected with said phototubes and operative to measure the varying concentrations of light reflected thereon, and a galvanometer interconnected with said circuit means responsive to indicate the measurement of varying light intensities, said galvanometer being calibrated in units of linear measure whereby the relative degree of phototube activation is translated into measured units to indicate the exact degree of misalignment existing between said spindle heads.

2. In an electronic aligning apparatus for movable elements of a machine tool, a source of light in combination with an optical instrument adapted to project a beam of light of a relatively uniform intensity and cylindrical cross section carried by one machine element, a prism carried by another machine element in position to intercept a beam of light projected by said optical instrument to divide it and reflect the several divisions in different directions with the divisions being equal when the machine elements are in the desired alignment, said machine elements carrying said prism and said optical instrument being relatively movable in mutually parallel planes, a photo-emissive tube mounted in operative relationship to each angular reflective face of said prism to intercept a division of said beam of light, an electric circuit comprising a Wheatstone bridge circuit so interconnecting said photo-emissive tubes that each of them constitutes a variable resistance branch thereof, a current sensitive galvanometer interconnected in said electric circuit and responsive to indicate the relative degree of unbalance therein caused by the different resistances offered by said photo-emissive tubes due to their intercepting unequal divisions of said light beam when said machine elements are not in alignment, said electric circuit arranged to be in balance with a corresponding zero registration of said galvanometer whenever said photo-emissive tubes are exposed to equal quantitative intensities of light, and mechanical means for selectively positioning said machine elements for moving said optical instrument and said prism into an axial aligned relationship determinable by a zero registration of said galvanometer which in turn is effected by a beam of light projected by said optical instrument being divided by said prism into reflected beams of equal intensity to equally activate said photo-emissive tubes and cause a balanced current condition in said electrical circuit which produces a zero reading on said galvanometer.

3. In an apparatus for aligning relatively movable machine elements, a light projector and a light receiver respectively mounted on each of said elements in axially parallel relationship, said projector being adapted to direct a light beam of relatively uniform cross sectional density and intensity outwardly toward said light receiver, said receiver being positionable to receive the beam of light from said light projector when in approximate axial alignment therewith, a prism in said receiver adapted to divide the projected light beam and reflect four equally spaced light beams of intensity varying in proportion to the degree of misalignment between said light projector and said light receiver respectively, electronic light sensitive means arranged to intercept each of said reflected light beams and to be activated in proportion to the relative intensity thereof, a Wheatstone bridge circuit interconnecting each opposed pair of said electronic light sensitive means, and a meter interconnected in each of said Wheatstone bridge circuits, said meter being calibrated in units of linear measure in manner to indicate the degree of unbalance between said electronic sensitive means in accordance with the measured degree of misalignment between said light projector and said light receiver.

4. An apparatus for aligning movable objects, including a light beam projecting instrument and an electronically sensitive target device adapted to be carried respectively by the objects to be aligned, said projector and said target disposed in axial alignment whenever said movable objects have been predeterminately moved into precise alignment, a pyramid prism mounted in said target device in manner that a beam of light emanating from said projector is centered upon the apex of said prism whenever said projector is in axial alignment therewith, the four angularly inclined reflective faces of said prism being adapted to reflect light beams of approximately equal intensity in mutually transverse planes, four phototubes respectively arranged to intercept and be activated by each of the light beams reflected from said prism, said phototubes being arranged in diametrically opposed pairs and adapted to be activated by reflected light beams in the same plane, two Wheatstone bridge circuits respectively arranged to interconnect each diametrically opposed pair of said phototubes, and two metering instruments respectively actuatable by said bridge circuits and coordinately operable to indicate the relative activation of each pair of said phototubes for indicating the degree of misalignment of said movable objects.

5. An aligning apparatus for a pair of independently movable machine tool members respectively carried for selective rectilinear movement in spaced apart parallel planes and comprising a light beam projector carried on one of said members, a pyramidal prism mounted on the other of said members and having its apex presented toward said projector in such manner that its four faces reflect divided portions of a light beam from said projector, said pyramidal prism being adapted to reflect four light beam divisions of equal intensity whenever said members are moved into alignment, four photocells disposed to be activated respectively by light beam divisions reflected from said prism faces, and indicating means responsive to said photocells and operative to indicate the degree and direction of any misalignment which may exist between said said projector and said prism for indicating the condition of alignment between said movable members.

6. In a milling machine, a pair of spindle heads carried for selective independent vertical movement in spaced apart parallel planes, selectively operable mechanical actuating means connected to move said spindle heads into alignment, and means for determining the alignment of said spindle heads comprising a light projector mounted on one of said heads adapted to project a beam of light toward the other of said heads, a prism having angularly inclined reflective faces carried by the other of said spindle heads adapted to intercept a beam of light from said projector and to divide and reflect the divisions in opposite directions with the divisions being equal when the said heads are in the desired alignment, a pair of light sensitive elements respectively mounted in operative relationship to the angular reflective surfaces of said prism, an electrical circuit of the Wheatstone bridge type so interconnecting said light sensitive elements that each of them constitutes a variable resistance branch thereof, a galvanometer interconnected in said circuit to indicate the relative degree of unbalance therein caused by the different resistances offered by said light sensitive elements due to their intercepting unequal divisions of the said light beam when said spindle heads are not in alignment, said electric circuit being arranged to be in balance with a corresponding zero registration of said galvanometer whenever said light sensitive devices are exposed to equal quantitative intensities of light whereby said galvanometer provides a visual indication of the movement required to bring said spindle heads into the desired alignment by selectively operating the said mechanical actuating means.

7. In a machine tool, a pair of independent spindle heads carried for selective relative movement in spaced apart parallel planes, a pair of tool spindles respectively carried by said spindle heads in operatively opposed axially parallel relationship, a self-contained light beam projecting instrument removably secured to one of said spindle heads in predetermined spaced relationship to the said tool spindle associated therewith, said light projecting instrument being adapted to project a beam of light toward the other of said spindle heads along a path parallel to the axis of said tool spindles, a self-contained light sensitive target device removably secured to the other of said spindle heads in predetermined spaced relationship to the said tool spindle associated therewith, said target device being provided with an opening adapted to receive the light beam from said projecting instrument whenever said spindle heads are so positioned as to bring the said tool spindles into approximate alignment, a beam dividing prism having angularly inclined reflective faces and being carried within said target device in a position to divide the light beam entering the opening formed therein and project the divisions thereof in different directions, a pair of light sensitive means carried within said device respectively associated with the reflective faces of said prism, each of said light sensitive means being adapted to be activated in proportion to the varying intensities of the beam divisions reflected thereon by said prism, circuit means operatively interconnecting said light sensitive means, and a galvanometer carried by said target device operatively connected to be activated by said circuit means for indicating the relative activation of said light sensitive means, said galvanometer being adapted to provide a zero registration whenever said prism divides the projected beam into two divisions of equal intensity to indicate a condition of exact alignment between said tool spindles.

References Cited in the file of this patent

UNITED STATES PATENTS

| | | |
|---|---|---|
| 1,811,895 | Ranger | June 30, 1931 |
| 2,065,365 | Doyle et al. | Dec. 22, 1936 |
| 2,102,587 | Eliel | Dec. 21, 1937 |
| 2,122,818 | Ladrach | July 5, 1938 |
| 2,139,474 | Shepard | Dec. 6, 1938 |
| 2,289,551 | Reason | July 14, 1942 |
| 2,292,968 | Peters | Aug. 11, 1942 |
| 2,342,828 | Armitage et al. | Feb. 29, 1944 |
| 2,385,503 | Glasser | Sept. 25, 1945 |
| 2,402,856 | Turrettini | June 25, 1946 |
| 2,425,750 | McCarty | Aug. 19, 1947 |
| 2,481,551 | Williams | Sept. 13, 1949 |

FOREIGN PATENTS

| | | |
|---|---|---|
| 539,858 | Germany | Dec. 3, 1931 |